April 23, 1957  J. O. BURMAN  2,789,482
PAD COVERING MACHINE AND ATTACHMENT
Filed Feb. 25, 1954  9 Sheets-Sheet 1

Fig. 1.

Inventor,
Joseph O. Burman,
by Townsend M. Gunn
Atty.

April 23, 1957  J. O. BURMAN  2,789,482
PAD COVERING MACHINE AND ATTACHMENT
Filed Feb. 25, 1954  9 Sheets-Sheet 2

Inventor,
Joseph O. Burman,
by Townsend M. Gunn
Atty.

April 23, 1957 J. O. BURMAN 2,789,482
PAD COVERING MACHINE AND ATTACHMENT
Filed Feb. 25, 1954 9 Sheets-Sheet 3

Inventor,
Joseph O. Burman.
by Townsend M. Gunn
Atty.

April 23, 1957  J. O. BURMAN  2,789,482
PAD COVERING MACHINE AND ATTACHMENT
Filed Feb. 25, 1954  9 Sheets-Sheet 5

Inventor,
Joseph O. Burman,
by Townsend M. Gunn
Atty.

Inventor,
Joseph O. Burman

April 23, 1957 J. O. BURMAN 2,789,482
PAD COVERING MACHINE AND ATTACHMENT
Filed Feb. 25, 1954 9 Sheets-Sheet 8

Inventor,
Joseph O. Burman,
by Townsend M. Gunn
Atty.

Fig. 24.

Inventor,
Joseph O. Burman,

United States Patent Office 2,789,482
Patented Apr. 23, 1957

2,789,482

PAD COVERING MACHINE AND ATTACHMENT

Joseph O. Burman, Norton, Mass., assignor to Progressive Machinery Corp., Attleboro, Mass., a corporation of Massachusetts Application February 25, 1954, Serial No. 412,615

14 Claims. (Cl. 93—54.2)

This invention relates to machines for covering forms with covering material, and in particular to machines for semi-automatically covering a jewelry box pad with a covering cloth.

The invention is also particularly concerned with a sub-assembly attachment for imparting to the covering for such a pad a set of extra tucks or gatherings at the sides, the effect of which is to give a loose fit of the covering material overlying the face of the pad, with the result that said covering material assumes (or can be arranged in) an attractive "waved" or swirled arrangement. Such pads are for the most part made by hand today, but with the present invention they can be made semi-automatically at a great savings in cost.

The said sub-assembly is adapted to be used in a machine of the type shown in my copending United States patent application Serial No. 322,719, filed November 26, 1952.

Among the several objects of the invention, therefore, may be noted the provision of a pad covering machine of novel type and operations; the provision of a machine of the class described for covering pads in such a manner that a swirl or draped effect may thereafter be given to the pad covering; the provision of a machine of the class described in which the covering operations, together with ejection of a finished pad from the machine, are done automatically, the only hand operations being the loading of the pad and covering material into the machine, and the pressing of a starting button; the provision of a machine of the class described which is adjustable for different sizes of pads; the provision of a machine of the class described in which certain mechanical operations are carried out in a timed sequence controlled by built-in adjustable timing means; the provision of a machine sub-assembly for imparting a set of gatherings in the covering material, the elements of said sub-assembly being controlled as to their motion, by motion of timing means in the basic machine; and the provision of a machine and sub-assembly therefore which are economical to build and operate. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated a preferred embodiment of the invention.

Similar reference characters indicate corresponding parts throughout the several views of the drawings.

Inasmuch as the sub-assembly which is one element of this invention is adapted for use with the machine set forth in said patent application Serial No. 322,719, and inasmuch as the combination of said sub-assembly and said machine is a preferred embodiment of this invention, a large part of the description of said machine is incorporated herein by reference, and attention is directed to said patent application for a detailed explanation of certain basic phases of the machine construction, adjustment, and operation. However, a brief statement of the fundamental machine construction will be now given here, as follows.

As explained in said patent application, the machine therein described comprised six assemblies of components, the six assemblies being (I) the base and table of the machine; (II) the drive bar with its associated timing shafts, drive cylinders, and timing switches; (III) the drive cam levers with their attachments; (IV) the wiper mechanism with its associated adjusting means; (V) the discharge platform with its cylinder drive means; and (VI) the electrical circuits. To the discharge platform of this basic machine there is now added another element, which is the sub-assembly referred to above. These various elements and assemblies will now be described, as follows:

I. The base and table

Figure 1:
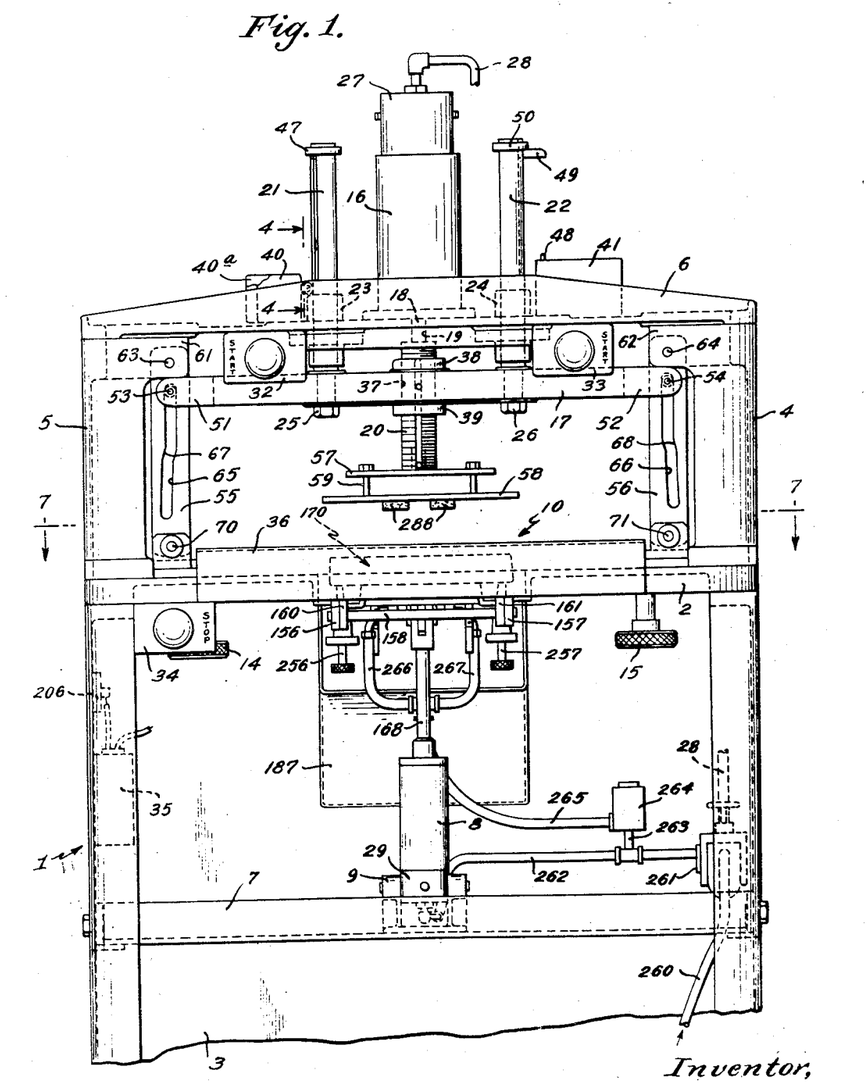
Fig. 1 is an elevation (front view) of a machine incorporating the principles of this invention.

Referring to the drawings, numeral 1 generally indicates the base with table 2, legs 3, columns 4 and 5, and top bar 6. On top bar 6 are mounted the air cylinder 16, the timing shafts 21 and 22, the timing switches 40, 40a, and 41 and the start switches 32 and 33. Shafts 21 and 22 slide up and down in suitably provided bushings 23 and 24. The piston rod 18 of cylinder 16 slides through a hole 19 in bar 6, and has fixed to its outer end the ram 20. A horizontally extending drive bar 17 is adjustably fastened to ram 20 by means of lock-nuts 38 and 39. The bottom ends of shafts 21 and 22 are fastened to drive bar 17 and hence are moved up and down by the latter. Cylinder 16 has at its top the double-acting valve structure 27, this valve being actuated by momentary electrical current, as explained in said patent application. Air is supplied to the cylinder by means of pipe 28.

A cross bar 7 is mounted on the base parallel to table 2, and has pivoted thereon the air cylinder 8. Cylinder 8 is smaller in cross-sectional area than cylinder 16, hence the force of the latter is greater than the force of the former. A double-acting valve structure 29 is provided for cylinder 8, and like valve 27, is actuated by momentary electrical current. Air is supplied to cylinder 8 by pipe 262.

Mounted on, and carried by table 2 is the wiper mechanism, indicated generally by numeral 10 (and described below and in said patent application). Table 2 is preferably made of a single piece of metal, and extends across the length and width of the machine. This table is supplied with a generally central opening 11 (for ejection of finished pads), and with slots 12 and 13 through which project the adjusting handles 14 and 15. On table 2 are mounted the stop switch 34, and certain other fixtures such as the switch 153, the signal lights 274 and 275, the sockets 152 (for receiving heater cord plugs), and the thermostat control 151. A transformer 35 is mounted on one leg of the machine, the transformer to supply a low value of voltage for operating the said valves.

II. Drive-bar and timing shafts

As has been set forth, drive bar 17 is actuated in an up-and-down direction by air cylinder 16, and motivates timing shafts 21 and 22. (The detailed attachment of drive bar 7 to ram 20 is set forth in said patent application.) Bar 17 is adjustable on ram 20.

Timing switches 40, 40a, and 41 are preferably of the snap-acting kind, and switches 40 and 40a are of the normally closed kind, while switch 41 is of the normally open kind. Switch 41 is a time delay switch, the closing of its contacts taking place after a calibrated time interval from the moment the switch plunger 48 is depressed.

Figure 4:
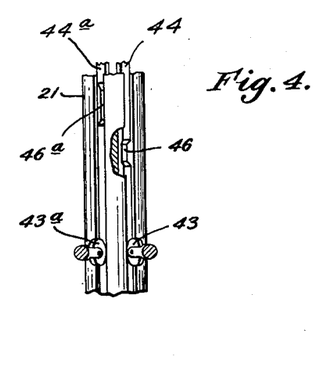
Fig. 4 is a view of a timing bar, taken in the direction of sight lines 4—4 on Fig. 1.

Switches 40 and 40a are provided each with the actuating plungers 42 and 42a respectively on the end of each of which are mounted the follower 43 and 43a respectively. Slidably fitted into grooves 45 and 45a in shaft 21 are the respective timing rods 44 and 44a. These rods are slidable lengthwise of the shaft, and are clamped in place by the clamp ring 47. Follower 43 bears against rod 44, in which is provided the notch 46 of such depth that when follower 43 enters it, the switch contacts in switch 40 will close. Similarly, follower 43a bears against rod 44a in which is provided the notch 46a of such depth that entry therein of follower 43a will close the contacts of this switch. Notch 46a is made longer than notch 46.

The actuating plunger 48 of switch 41 is pushed by the finger 49 which is adjustably clamped by clamp band 50 to shaft 22. Thus a downward motion of drive bar 17 will eventually momentarily close the contacts of switches 40 and 40a, and close the contacts of switch 41.

As explained in said patent application, there is mounted in each end of drive bar 17 a roller, 53 and 54 respectively, in a suitably provided clevis 51 and 52.

On the lower end of the ram 20 is mounted the pressure plate assembly comprising the fixed upper plate 57, the movable bottom plate 58, the slidable guide parts 59 and 60 sliding in suitably provided holes in plate 57, and the rubber pressure pad 288.

III. Drive cam-levers

Figures 5, 6:
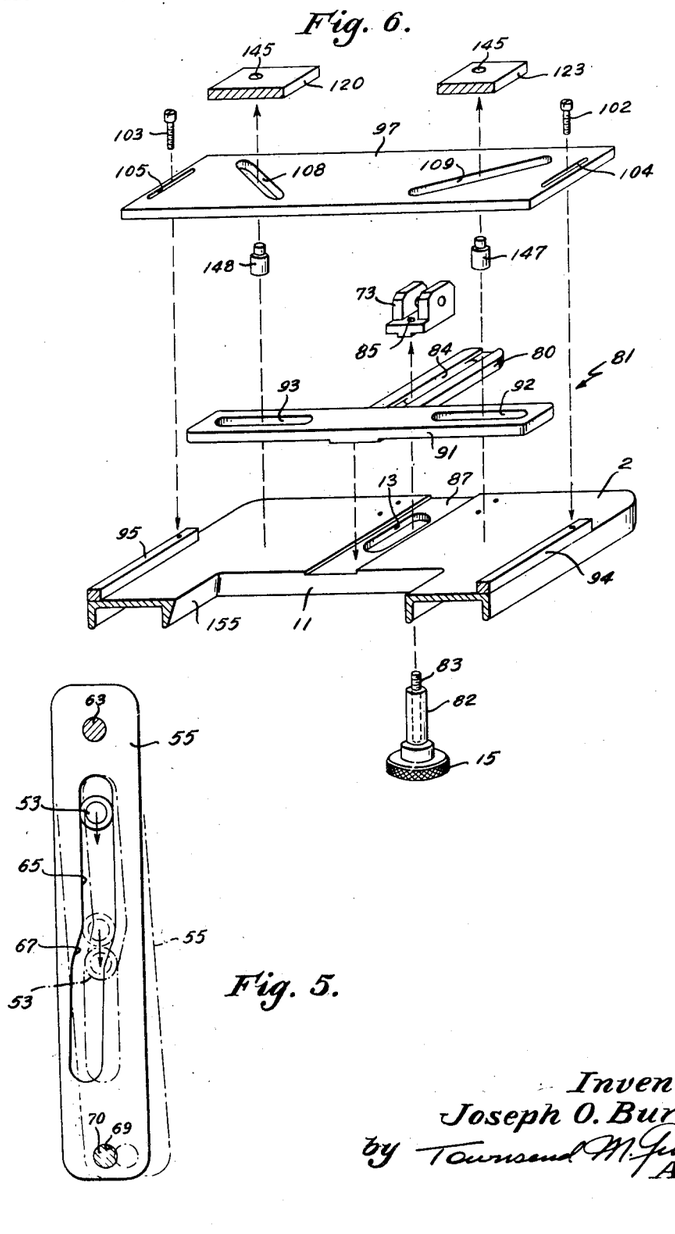
Fig. 5 is an enlarged side view of a cam lever of this invention, the dotted lines showing a second position thereof.
Fig. 6 is an exploded view in perspective of certain operating parts of the Fig. 1 machine.

Cam levers 55 and 56 pivotally depend from extensions 61 and 62 on top bar 6. Each of the cam levers is provided with the cam slots 65 and 66 respectively, which receive the rollers 53 and 54 as cam followers. As to cam lever 55, the cam slot extends vertically downward, then has the leftwardly inclined cam rise 67, and then extends almost vertically downward again. Similarly, the cam rise 68 in lever 56 slants outwardly or to the right. Thus, as drive bar 17 moves down, the effect of the cam rises is to swing the cam levers inwardly, and vice versa. (Further details of the cam slots and rises are given in said patent application, to which attention is directed.)

At the lower end of each cam lever is pivotally attached (as by pivot pins 70 and 71) the respective bifurcated adjusting clevises or shoes 72 and 73 respectively. Clevises 72 and 73 are adjustably clamped (by means of clamp screws 14 and 15) respectively to T-bar stems 74 and 80, all as described in said patent application and is clearly shown in Figs. 6 and 8. Thus, downward motion of drive bar 17 will cause cam levers 55 and 56 to move inwardly, and thus will cause the T-bars to move toward each other.

IV. Wiper means and adjustment

Table 2 is provided with the grooves 86 and 87 which slidably receive and guide the stems of the T-bars. The cross-bars of each of the T-bars is provided with the slots 89, 90, 92 and 93. Mounted over the T-bars are the cam plates 96 and 97 which are adjustably supported on the runners 94, the plates being movable toward or away from each other, and being provided with the diagonally extending slots 106, 107, 108 and 109. These slots overlap, each, one of the slots in the cross-bars of the T-bars.

Overlying the cam plates are the wipers or finger elements indicated generally by numerals 120, 121, 122, and 123. These wipers are fingers which, upon being actuated, slide toward each other to wipe covering material over a pad in position to be pressed down and stuck. They comprise a set of intermeshing tongue and groove plates with the tongue of one wiper sliding in the groove of the adjacent one, and each tongue is provided with a heater element.

Figures 13, 14, 15, 16, 17, 18, 19:
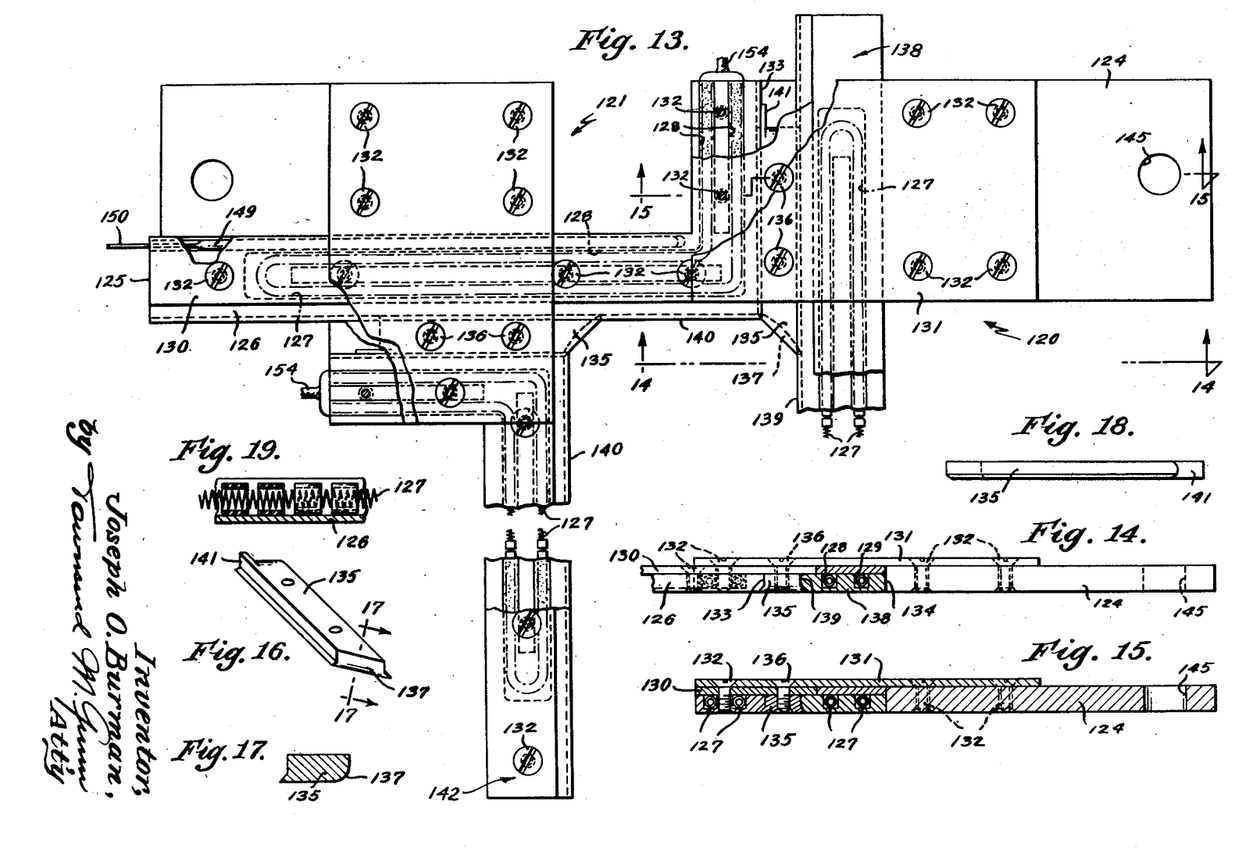
Fig. 13 is fragmentary plan view of one of the wipers used in this invention.
Fig. 14 is a cross-section of the Fig. 13 construction, taken in the direction of sight lines 14—14 thereon.
Fig. 15 is a view similar to Fig. 14, but taken in the direction of sight lines 15—15 on Fig. 13.
Fig. 16 is a perspective view of a corner plate of the Fig. 13 wipers.
Fig. 17 is a cross-sectional elevation of the Fig. 16 corner plate, taken in the direction of sight lines 17—17 thereon.
Fig. 18 is a side view of the corner plate of Fig. 16.
Fig. 19 is a fragmentary longitudinal section of one of the heating element grooves of the Fig. 13 construction.

Briefly, each wiper is a built up element, as shown in Fig. 13. For example, wiper 120 has the base plate 124 and the attached elongated tongue 125. The latter comprises the L-shaped heater plate 126, the interiorly mounted heater element 127, and the overlying cover plate 130. Cover plate 130 is fastened to heater plate 126 by means of screws 132 as shown. The L-shaped tongue assembly 125 is positioned with respect to the base plate so as to leave a space there between which is partly filled with the corner plate 135 which is likewise fastened to cover plate 131 by screws 136. Corner plate 135 has its right and left hand edges chamfered, as shown, and one end 137 is formed at an angle in order to provide an obliquely slanted corner in the completed structure. The other end of plate 135 has the fin 141 extending therefrom. As explained in said patent application, the edges of the corner plate are chamfered, as are also the edges of the tongues, to provide mating parts which will fit together as shown.

In similar manner the other wipers are formed. Wiper 121 has tongue 142, wiper 122 has tongue 143, and wiper 123 has tongue 138. Thus the wipers, when assembled in intermeshing manner, define a central opening the size and shape of which may be carried by sliding the wipers toward or away from each other.

When pads having cut off corners are to be covered, the corner plates are inserted so that the obliquely angled corner acts as a wiper across the corner of the pad. When pads having right angled corners are to be covered, the corner plates are reversed, so that the fins 141 lie along the matching tongue. These fins prevent covering material from being caught in the crevice between a corner plate and tongue.

As explained in said patent application, each of the tongues is bimetallic in construction, the heater plate 126 (for example) being made of brass and the cover plate 130 being of Invar. Thus, when heated, each tongue will bow slightly so as to give additional pressure at the middle of the pad edges.

Figure 7:
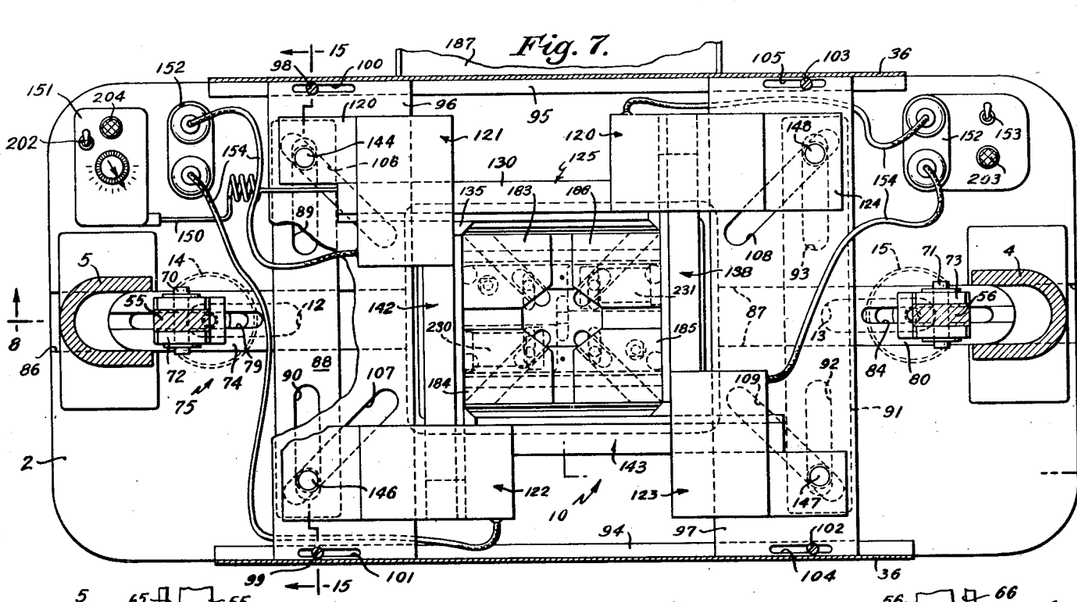
Fig. 7 is a top view of the table assembly of the Fig. 1 embodiment, including a sub-assembly, taken in the direction of sight lines 7—7 on Fig. 1.
Figure 8:
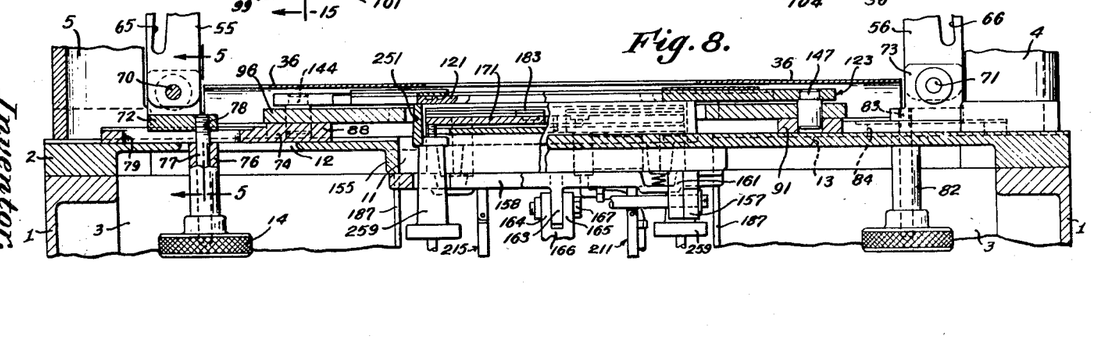
Fig. 8 is a cross-sectional view of the Fig. 7 construction, taken along sight lines 8—8 of Fig. 7.

The connection of the wipers to the T-bars and actuation thereby is as follows: Referring to Figs. 6, 7, and 8, and referring to wiper 121 as an example, a stud 144 is fastened to stud 121 by being press fitted into a hole 145 provided in the wiper in such a position as to overlap both slot 89 in T-bar 75, and slot 100 in cam plate 96. Stud 144 projects downwardly and slidably engages slots 89 and 106. In similar manner studs are fastened in the other wipers, with stud 146 in wiper 122 engaging slots 90 and 107; stud 147 in wiper 123 engaging slots 92 and 109; and stud 148 in wiper 120 engaging slots 93 and 108.

The longitudinal (as to the table) motion of the T-bar slots, acting in conjunction with the inwardly inclined slots in the cam plates, now will constrain the wipers to move toward each other. That is, the slots in the cam plates determine the direction of the motion of the respective studs and hence of the respective wiper, while the T-bars are the motivators. These motions are described in greater detail in said patent application.

The wipers may be adjusted for the length of the pad to be covered, as follows:

Cam plates 96 and 97 are fastened tight by tightening the clamping screws 98, 99, 102 and 103. Thus the clamp screws 14 and 15 are loosened slightly to permit the T-bars to be moved toward or away from each other, as the occasion warrants, until the inner ends of tongues 142 and 138 are the proper distance apart. Then the clamps 14 and 15 are tightened, and the cam plate screws are loosened to permit motion of these plates toward or away from each other. Such motion of the cam plates will move wipers 120 and 122 relative to each other to adjust for the width of the pad to be covered. After the adjustment is made, the cam plate screws 98, 99, 102 and 103 are again tightened.

It will be observed that if length is adjusted for first, the T-bar slots are thereafter fixed, and hence the adjustment for width does not alter the previously made length adjustment.

For controlling the temperature of the wipers, a thermally sensitive bulb 149 is mounted in one of them as shown. The tube 150 from this connects to the control thermostat 151. Plugs from the heating elements plug into sockets 152 on table 2, and an on-off power switch serves to connect or disconnect the sources of power to the machine.

V. *Discharge door and wiper sub-assembly*

As has been indicated above, the table 2 is provided with a generally centrally located opening or discharge hole 11. This may advantageously be of square or rectangular shape, and should be larger than the largest pad to be made, since the latter will be ejected through the hole; and also, nested in the hole will be the tuck wiper sub-assembly. (This sub-assembly of wipers is called the "tuck" wiper sub-assembly or the "tuck wipers" herein, because it is these wipers which gather the covering material on the face of the pad and thus effectuate the tucks.)

In the present instance, opening 11 is provided with the downwardly projecting lip 155 which may be cast and machined as an integral part of table 2. Pivoted to a pair of brackets 160 and 161 which depend from the underside of table 2 is a platform or door 158, this door being hung on these brackets by means of the shaft or pin 159 which passes through the protruding bored ears 156 and 157 on the door. The pivot holes in brackets 160 and 161 are elongated, and the door can thus move vertically up and down a short distance, as well as swing on the pivot pin. Also located on the underside of the door is the plate 163 which fits between the bifurcations 164 and 165 of the clevis 166 to form a knuckle-joint, bolt 167 holding the joint together. Clevis 166 is fastened to the piston shaft 168 of the air cylinder 8 by means of a conventional threaded connection with a locknut. When air flows into cylinder 8, the piston closes door 158, and vice versa.

A tuck wiper sub-assembly indicated generally by numeral 170 (see Figs. 9, 10, 11 and 12 for details) is mounted on door 158, and will now be described. Basically, the sub-assembly comprises the following elements: a bed, wiper plates, wiper plate actuators, air cylinders to move the actuators, and adjusting means to vary the stroke or motion of the actuators.

Figure 23:
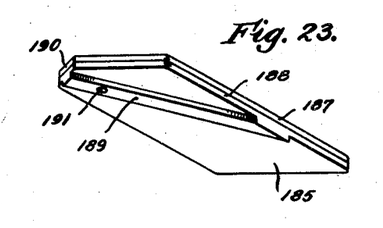
Fig. 23 is a perspective bottom view of a tuck wiper plate used in the sub-assembly of Fig. 9.

Thus, a bed or table 171 is provided comprising a flat rectangular plate which is fastened to door 158 by the downwardly extending legs or sides 172 and 173, as by bolts 174. Thus bed or table 171 is immovably fastened to door 158, and swings downwardly when door 158 swings down. Bed 171 is cut through with four diagonally inclined slots 175, 176, 177, and 178. On the top surface of the bed are provided the four grooves 179, 180, 181 and 182, the grooves being aligned with the said slots, one to each slot. Four tuck wiper plates 183, 184, 185 and 186 are provided as shown in Fig. 23. Each wiper plate is bilayered, the top surface 187 being rubber which is bonded to the bottom layer 188 which is preferably steel. A key 189 is provided on each plate, and the key in each plate slides in one of the grooves 179, 180, 181 and 182. Thus the plates, when placed on table 171 with their keys engaging the respective grooves, are free to slide diagonally on the plate, their motion being guided by the keys in the grooves. Each wiper plate, as shown in Fig. 23, is rectangular in shape with one corner 190 of each plate cut off to provide an opening when the plates are slid inwardly on table 171 until their inner edges and ends meet. A hole, 191, is provided in each wiper plate into which is press fitted one of four guide pins 192, 193, 194 and 195, these pins fitting respectively into wiper plates 183, 184, 185 and 186. These guide pins slide respectively in slots 175, 176, 177, and 178 and project downwardly through the bed 171.

Figure 22:
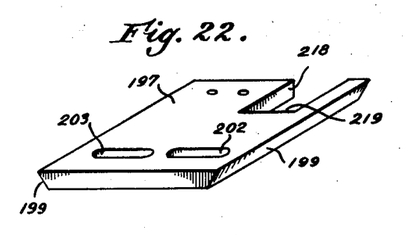
Fig. 22 is a perspective view of an actuator plate used to move certain wiper plates.

On the under side of bed 171 are provided two wiper plate actuators 196 and 197, one of which is shown in perspective in Fig. 22. (These will hereinafter be called actuators.) Each actuator is rectangular in shape and of such size as to slide between legs 172 and 173, one at each end of bed 171. A V-groove 198 is milled into the inside corner of each leg and a corresponding chamfer 199 on each edge of each actuator fits these grooves to retain slidably the actuators up against the bottom surface of bed 171. Each actuator is provided with a pair of slots near its inner end, actuator 196 being provided with guide slots 200 and 201, and actuator 197 having guide slots 202 and 203. These slots are positioned to overlap the guide slots 175, 176, 177 and 178, slot 200 overlapping slot 175, 201 overlapping 176, 202 overlapping 177, and slot 203 overlapping slot 178. Thus, when the wipers and actuators are assembled on bed 171, pin 192 engages slot 200; pin 193 engages slot 201; pin 194 engages slot 202; and pin 195 engages slot 203; all engagements being a close but slidable fit.

It will now be seen that if the actuators 196 and 197 are caused to move toward and away from each other, the guide pins 192, 193, 194 and 195 will be forced to move, and as a result the four actuators will move diagonally inwardly and outwardly, the diagonal motion being caused by the said keys and grooves.

The extent of backward motion of the actuators is made adjustable by the adjusting eccentrics indicated generally by numerals 210 and 211. (See Fig. 10.) Each eccentric (211 for example) comprises the handle 212 hinged to the post 213. Handle 212 can be turned at right angles to the post to provide a crank for turning the post. Post 213 passes slidably through a hole 214 in door 158 and has an enlarged inner end 215 which prevents it from dropping through the door. An outwardly extending flange 216 is provided, and that portion of end 215 above flange 216 is cut to a four-sided eccentric, as shown by numeral 217 in Figs. 9 and 10. The height of eccentric end 217 above the door 158 is such as to bring the end to the height of actuator 197, and a slot 218 is cut in this end of the actuator to provide clearance for the eccentric. The edge 219 of this slot butts up against one of the four faces of the eccentric and this stops or limits the backward or outward motion of the actuator. Since the axis of the post is fixed relative to bed 171, and since each side or face of the eccentric 217 is a different distance from the post axis, the outer position of the actuator is determined by rotating the post 213 until the proper eccentric face is resting against edge 219. The uppermost end 220 of post 213 is reduced to be about the same diameter as post 213 and engages a bearing hole 221 provided in the under surface of bed 171. A spring 222 presses against flange 216 and keeps the end 220 frictionally bearing in hole 221, thus preventing random turning of the post 213. The other eccentric 210 is made and functions exactly as does the one set forth above. Its similar description is therefore omitted, except to state that its eccentric end engages a slot 223 provided in the end of actuator 196. Stop pins 321 limit the forward (or inward) motion of the actuators, these pins being fastened in bed 171.

As has been indicated above, motion of the actuators will give the desired motion to the wiper plates. This motion is provided by a pair of air cylinders 230 and 231 as will now be described. The end of the piston shaft of each cylinder (232 and 233 respectively) is fastened to a plate (numerals 234 and 235 respectively), and these plates are bolted to the ends of legs 172 and 173 so that the plates extend inwardly as shown and at right angles to the legs. Thus the cylinders lie parallel to the legs, and cylinder 230 has its end bolted to actuator 196, while the end of cylinder 231 is bolted to actuator 197. Thus, when air is admitted to the cylinders, the pistons stay immovable (being fastened to the legs as aforesaid) but the cylinder bodies move, carrying with them the actuators. These cylinders are of the kind that return to the shaft-retracted position automatically when the air pressure is released. Air is admitted to and released from each cylinder by the fittings 236 and 237. These extend below the level of door 158, and since they move with the cylinder bodies, proper slots 238 and 239 (see Figs. 10 and 12) are provided in the door to permit this motion.

Since the wiper plates lie loosely on top of bed 171, means are provided to keep them firmly anchored yet in a slidable manner. These means are the four permanent magnets 240, 241, 242, and 243, indicated by dotted lines in Fig. 9, which are embedded in bed 171 with their surfaces flush with the surface of the bed. The wipers, as aforesaid, are preferably made of steel, and the attractive forces between the magnets and the wipers hold the wipers to the bed yet allow the wipers to slide.

Figure 9:
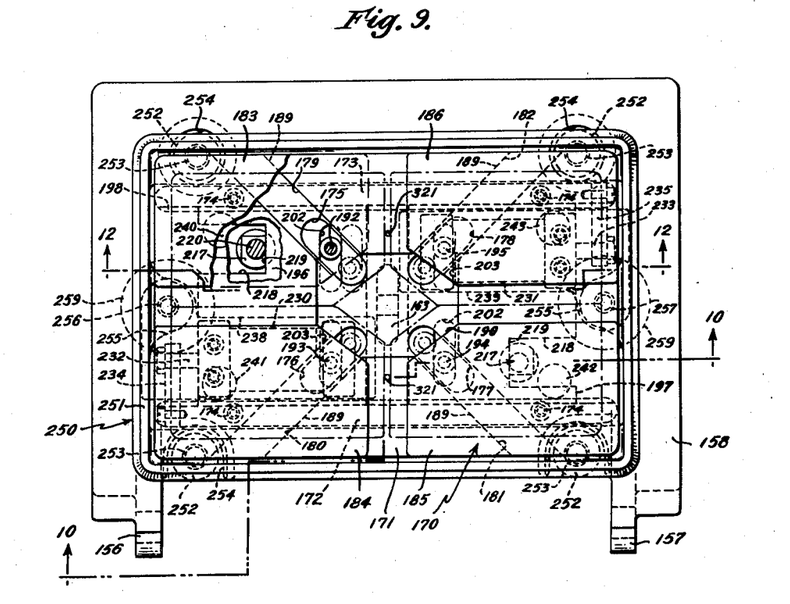
Fig. 9 is a plan view (with a part thereof broken away) of a sub-assembly of the Fig. 1 machine.
Figure 10:
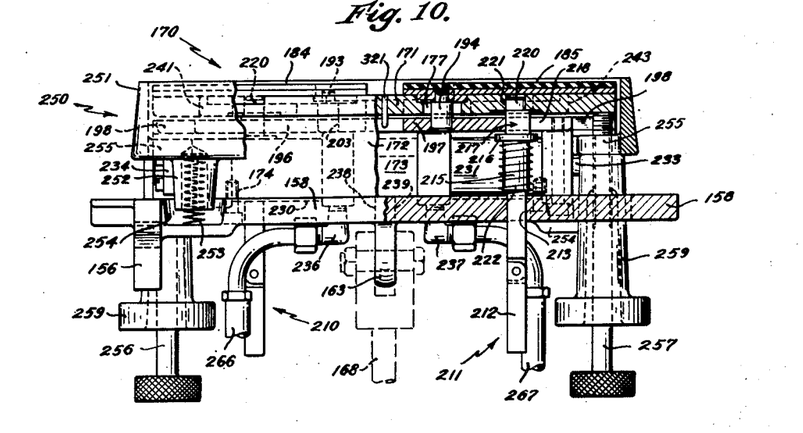
Fig. 10 is a cross-sectional elevation of the Fig. 9 sub-assembly, taken in the direction of sight lines 10—10 thereon.
Figure 11:
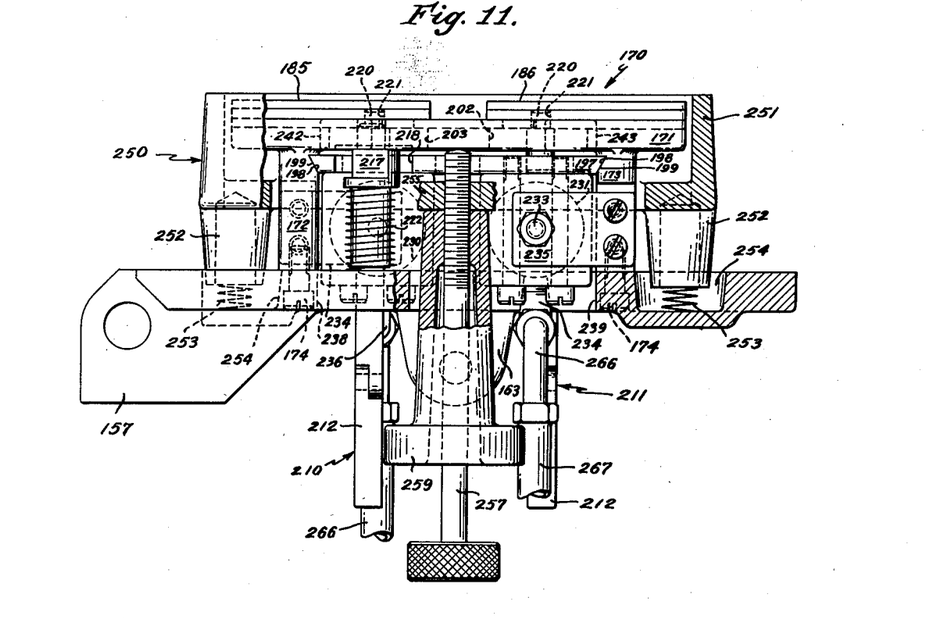
Fig. 11 is an enlarged right hand end view of the Fig. 9 sub-assembly, with certain parts broken away.
Figure 12:
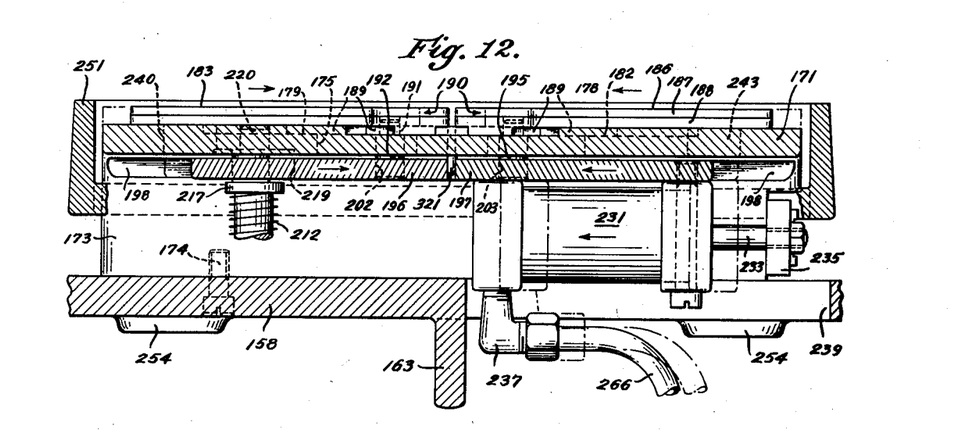
Fig. 12 is an enlarged cross-sectional elevation of the Fig. 9 sub-assembly, taken in the direction of sight lines 12—12 thereon.

To clarify, at this point, the action of the wipers, actuators, and cylinders, it is pointed out specifically that in Fig. 9, the dot-and-dash line shows the closed position of the parts, that is, with the wiper plates moved all the way inward. The solid lines in Fig. 9 represent the positions when the wipers are all the way out or away from each other. In Figs. 10 and 11, the parts are shown with the wiper plates open, or away from each other. In Fig. 12, the solid lines show the parts with the wipers closed, and the dot-and-dash line shows the parts with the wipers open.

The other element that is carried by door 158 is the pad spacer indicated generally by numeral 250 which is like the pad spaces described in the aforesaid patent application. It will now be described.

Pad spacer 250 comprises the upstanding frame 251 which surrounds the bed 171 and is spaced apart therefrom. The frame 251 is provided with four legs or bosses 252 (see Fig. 10) at approximately the corners of the frame. Each of these bosses is provided with a bore which receives a compression spring 253, the lower end of which fits into a well 254 in door 158. Each of springs 253 is long enough to support the frame resiliently on door 158, as shown. Two sides of the frame are provided with the inwardly turned bosses 255. These bossses are provided with tapped holes into which screw the long adjusting screws 256 and 257 (see Fig. 10). The long barrel shaped nuts 258 and 259 are each threaded at their inner ends so as to screw on the screws 256 and 257 and set as lock-nuts against the bosses 255. Screws 256 and 257 are made long enough at their threaded end so as to bear against the underside of bed 171. Thus by turning the adjusting screws, the height of frame 251 above the door 158 may be adjusted against the compression of spring 253. By this means, the tongues of the upper (or pressing) wipers which ride on the top edge of the frame, are adjusted to a given height above the top of the bottom or tuck wiper plates, the separation being such as to receive a pad and its covering material. However, the frame 251 can be depressed against the resistance of springs 253 during the pressing action of wipers and ram.

Throughout this description, the use of air cylinders as the motive power has been mentioned. However, it is to be understood that oil or other fluid operated cylinders can be used, the term fluid being used in a generic sense.

The pneumatic connections are as follows:

Air is supplied by pipe 260 to the combined and oil vapor distributing unit 261. From unit 261 it flows by pipe 28 to cylinder 16, and by pipe 262 to cylinder 8. A branch pipe 263 supplies air to the solenoid valve 264. From this valve, air flows by flexible hose 265, 266 and 267 to the cylinders 230 and 231.

A discharge chute 187 may be used, if desired the door 158 opening in line with this chute.

VI. Electrical circuit

The wiring circuit for this machine is the same as that described in said patent application for use of that invention as a pad covering machine, with the exception of the addition of switch 40a, and the sub-assembly 170 with its associated air cylinders, tuck wipers etc. A description of the wiring connection will now be given.

Figure 24:
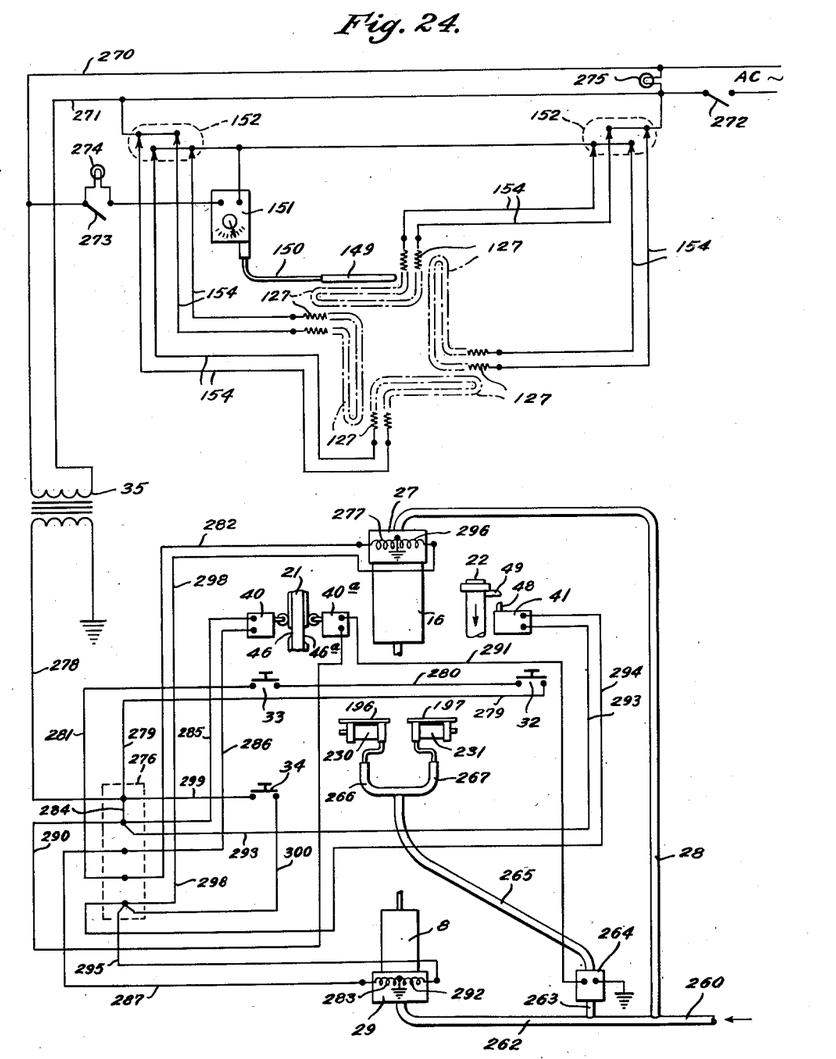
Fig. 24 is a schematic diagram of the wiring circuit for the Fig. 1 machine.

Referring to Fig. 24 in which is shown partly schematically and partly pictorially the wiring diagram of this invention, the power source is indicated by A. C. and is connected by wires 270 and 271 to the primary of transformer 35. The main power switch 272 is shown, as well as the heater switch 273. Signal lights 274 and 275 may also be connected in, if desired. For simplicity's sake, one connection is indicated as a ground connection, the corresponding ground being indicated where necessary. Several connections are made by terminal board 276. The drive cylinders are powered by low voltage as is also the solenoid valve 264 for air cylinders 230 and 231. The start switches 32 and 33 as well as stop switch 34 are open.

With drive bar 17 in its top position, follower 43 is below cam notch 46 in timing rod 21, so that switch 40 is open. Likewise, follower 43a is below notch 46a, so that switch 40a is open. Finger 49 is up, so that switch 41 is open. Upon pressing both start buttons (32 and 33) current flows from transformer 35 to solenoid 277 in valve 27 via wires 278, 279, 280, 281, and 282. Piston 16 moves down, carrying downward both timing rods 21 and 22, as well as drive bar 17. Piston 16 continued to move downwardly (even though switches 32 and 33 are released), and eventually follower 43 moves into notch 46 and switch 40 closes its contacts momentarily. By so doing, current is allowed to flow to solenoid 283 of valve 27 (via wires 278, 284, 285, switch 40, wires 286 and 287) to cause this air cylinder to close the door 158 if this is not already closed. At the same time or shortly thereafter, follower 43a moves into notch 46a to energize valve 264 and hence air cylinders 230 and 231. Notch 46a is so adjusted relative to the drive bar 17 and hence to ram 20, that valve 264 is not energized until the rubber pad 288 lightly presses on pad 311. (Valve 264 is energized by current flowing through wires 278, 284, 290, switch 40a and wire 291.) Air cylinders 230 and 231 thus move the tuck wipers inwardly and notch 46a is made long enough to continue the energization of valve 264 (and thus maintain tuck wipers 183, 184, 185 and 186 in their inward position, until fingers 49 presses plunger 48 in switch 41. Meanwhile, drive bar 17 has continued to move downwardly to actuate cam levers 55 and 56 to move tongues 125, 142, 143, and 138 inwardly to wipe the covering material over the back of the pad and press it there. Finally, finger 49 causes, after a time delay, the contacts of switch 41 to close. This energizes the retract solenoid 292 of valve 29 through wires 278, 284, 293, switch 41, wires 294 and 295; current also flows to solenoid 296 of valve 27 as follows: by wires 278, 284, 293, switch 41, 294 and 298. Drive bar 17 now moves up, and door 158 moves down.

When door 158 moves down, the sub-assembly 170 moves with it carrying the finished pad. This latter is ejected from the sub-assembly by being blown therefrom, for example. As drive bar 17 moves up, follower 43 momentarily enters notch 46 again to close door 158. Also, follower 43a is forced out of notch 46a, and cylinders 230 and 231 are caused to retract wipers 183, 184, 185 and 186. Thus the machine is now ready for another cycle.

If at any point in the cycle it is desired to return drive bar 17 to its uppermost position, all that is necessary is to close stop switch 34 momentarily. By so doing, current flows by wires 278, 299, switch 34, wires 300 and 298 to the retract solenoid 296 of cylinder 16; and by wire 295 to the retract solenoid 292 of cylinder 8.

The heating elements 127 are connected, as shown in the power supply by means of plug connections into outlets 152, their connections being made by flexible wires 154 so as to permit free motion of the wipers.

*Operation for pad covering*

The adjustments and operation of the machine are fully explained in said patent application, with the exception of the operation of the sub-assembly 170. However, for clarity, a description of the operation will be given now.

Figure 2:
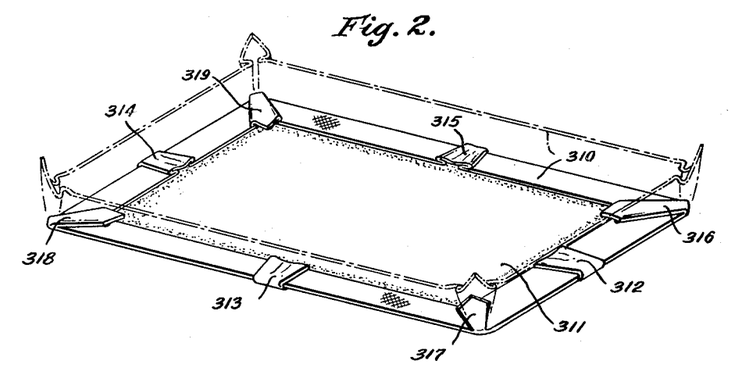
Fig. 2 is a perspective view of a finished pad produced by the Fig. 1 machine.
Figure 3:
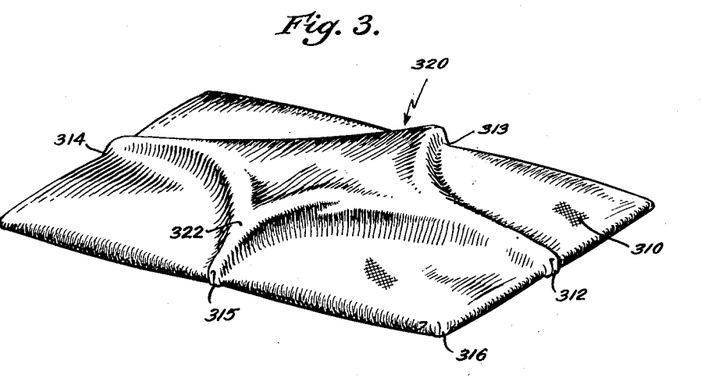
Fig. 3 is a perspective view of the front or top face of the Fig. 2 pad.

A reference to Figs. 2 and 3 will show the kind of pad which is made on the machine of this invention. The dot-and-dash lines of Fig. 2 show the covering material 310 as it stands up around the pad 311 just prior to the tucking and pressing operations. The full lines in Fig. 2 show the back side of a complete pad, particularly how the edge tucks 312, 313, 314 and 315 are pressed in. The corner folds 316, 317, 318 and 319 are the result of the folding and pressing action of the diagonally shaped ends 137 of the reversible inserts 135. Figure 2 is a face view (in perspective) of the pad, and shows generally by numeral 320 the fullness of the covering material, this fullness resulting from the "gathering" action of the tuck wiper plates.

Assuming a starting position with the drive bar 17 and ram 20 up, and with the switches 40, 40a and 41 open, then door 158 will be closed, and both sets of wipers will be fully retracted. A pad (generally a rectangularly shaped piece of cardboard) is laid on the top of sub-assembly 170, and tongues 125, 142, 143 and 138 are adjusted (as described above) until the edge of each tongue just touches the corresponding edge of the pad. Screws 256 and 257 are adjusted to vary the height of frame 251 (bearing the wiper tongues) until the wiper tongues are able to slide over the pad and its covering material without hindrance.

Figure 20:
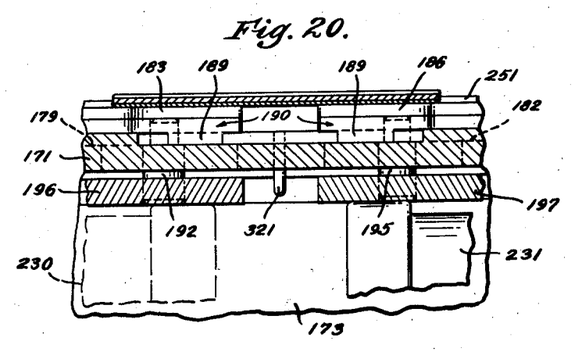
Fig. 20 is a fragmentary detailed section of the Fig. 12 construction, to show certain loading details more clearly.

With the main power and heater switches turned on so that the heater 127 in the wiper tongues become hot, a piece of covering material 310 is laid across the top wiper tongues 125, 142, 143 and 138 approximately centrally under ram 20b. Pad 311 is now laid over the covering material and is pressed down firmly until the covering material rests on the wipers 183, 184, 185 and 186. A reference to Fig. 20 will show a section of pad and covering material in this position.

Figure 21:
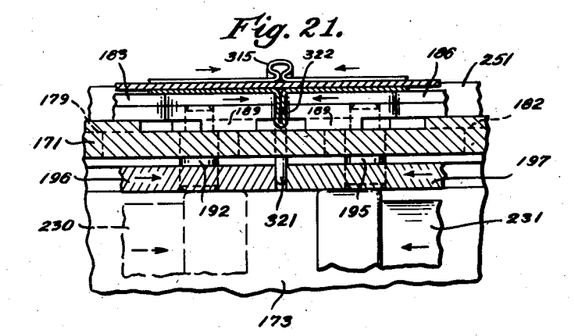
Fig. 21 is a view similar to Fig. 20, but showing certain working parts (the wipers) in a second position.

Start switches 32 and 33 are now pressed to start the cycle, and as described above, ram 20 is moved downward. This energizes, by means of switch 40a, the air cylinders 230 and 231 in the sub-assembly 270. Notch 46a is so adjusted to have this energization take place at the point where the rubber pressure pad 288 engages the pad 311 lightly, yet firmly enough to hold the pad from sliding, and just prior to the point that the cam followers 53 and 54 engages the cam rises 67 and 68, that is, just prior to the inward wiping of tongues 125, 142, 143 and 138. Wipers 182, 184, 185 and 186 now move inward (as shown in Fig. 21) and the rubber facing or top surface of these wipers "gathers" the material on what is to be the face of the pad. This "gathered" material is shown by numeral 322 in Fig. 21, being given an opportunity to extend downwardly in the space provided by the cut off corners of the tuck wipers. The resulting tuck or fold at the back of the pad is shown at 315. The wipers 125, 142, 143 and 138 are now moved inwardly by the cam levers 55 and 56 to wipe and press the covering material on the back of the pad, thus forming the deep tucks 312, 313, 314 and 315.

It will be observed that by the symmetrical motion of the tuck wipers 183, 184, 185 and 186 with respect to the pad, that is, on any edge two wiper surfaces are moving toward each other to gather material toward the approximate center of that edge, the kind of tuck obtained is uniform and unlike that produced by any other pad forming machine.

Ram 20 contrives to move downward, meanwwhile causing finger 49 to push plunger 48. This continued motion of the ram causes the top wiper to act as hot pressing irons to press the covering material firmly against the back of the pad, the frame 251 depressing resiliently under this continued motion of the ram. The time delay interval caused by switch 41 permits the heated wipers to set the adhesive.

After switch 41 closes its contacts, ram 20 moves up, and door 158 opens. The pad is discharged and switch 40 then causes door 158 to close again, and the machine is ready for another covering cycle.

It will be noticed that in this preferred embodiment, the machine is loaded from the top, and unloads from the bottom. Thus, there is always a clear top space for the loading operation. However, if desired, the door 158 may be dispensed with, and the sub-assembly 170 mounted immovably in the table. In such an event, unloading of the finished pad must be from the top, but can be done, for example, by an air blast, the switch 41 being used to retract the drive bar 17, and switch 40 to open momentarily a valve for an air blast.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A pad covering machine comprising: a table; pad holding means supported by the table; a first reciprocating means supported by the table on one side of said pad holding means; second reciprocating means mounted on said table and slidable toward and away from said pad holding means; said pad holding means comprising a subassembly supported by said table on the side of said second reciprocating means remote from said first reciprocating means and including a third reciprocating means slidable along one face of a pad mounted on said holding means; adjustable guide means mounted on said table for guiding said second reciprocating means; adjustable means mounted in said subassembly for adjusting the stroke of said third reciprocating means; adjustable cam means connecting said first reciprocating means and said second reciprocating means for causing the latter to move in predetermined relation to said first reciprocating means; and timing means for sequentially timing the predetermined motions of said first, second and third reciprocating means.

2. A pad covering machine comprising: a stand; a table supported by the stand and having a discharge hole therein; pad holding means positioned in said hole; a first reciprocating means supported by the stand on one side of said pad holding means; a second reciprocating means supported by the stand on the other side of the pad holding means; a door carrying said pad holding means and movably mounted with respect to said table, said door being actuated by said second reciprocating means; third reciprocating means mounted on said table and slidable toward and away from said pad holding means; said pad holding means including a subassembly having a fourth reciprocating means slidable along one face of a pad mounted on said holding means; adjustable guide means mounted on said table for guiding said third reciprocating means; adjustable means in said subassembly for adjusting the stroke of said fourth reciprocating means; adjustable cam means connecting said first reciprocating means with said third reciprocating means for causing the latter to move in predetermined relation to said first reciprocating means; and timing means for sequentially timing the predetermined motions of said first, second and fourth reciprocating means.

3. The machine of claim 2 in which said third and fourth reciprocating means each comprises a plurality of finger plates, the plates of one of said means sliding in a plane substantially parallel to the plane in which the plates of the other of said means slide, said planes being in spaced relation to each other.

4. A pad covering machine comprising: a stand; a table supported by the stand and having a discharge hole therein; pad holding means positioned in said hole; a first reciprocating means supported by the stand on one side of said pad holding means; a second reciprocating means supported by the stand on the other side of said pad holding means; a door movably mounted by a pivoted connection on said table between said second reciprocating means and said pad holding means, said door carrying said pad holding means and being actuated by said second reciprocating means; a plurality of first wipers movably mounted on said table and slidable toward and away from said holding means; a plurality of second wipers in said pad holding means and slidable toward and away from each other in a plane substantially parallel to but spaced from the plane of motion of said first wipers; adjustable guide means mounted on said table for directing the motion of said first wipers; adjustable means operatively connected to said second wipers for adjusting the length of their stroke; first drive means slidably mounted on said table and operatively connected to said first wipers; second drive means operated by said first reciprocating means; adjustable cam means connecting said first and second drive means; third reciprocating means mounted on said door for driving said second wipers; and timing means for sequentially timing the predetermined motions of said first, second and third reciprocating means, and thus said first and second drive means, said cam means, said wipers, and said door.

5. The machine of claim 4 in which said first wipers comprise plates each having a base portion and a tongue portion, each of said plates having a groove on its underside adapted to receive slidably the tongue portion of the adjacent plate; and in which said third reciprocating means includes at least one fluid-actuated means operatively connected to said second wipers.

6. A pad covering machine comprising: a stand; a table supported by said stand and having a discharge hole therein; pad holding means positioned in said hole; a first fluid-actuated reciprocating means supported by the stand on one side of the table; a second fluid-actuated reciprocating means supported by the stand on the opposite side of the table; a movable door pivotally hinged to the table and adapted to act as a closure for said hole, said door carrying pad holding means and being actuated by said second fluid-actuated means; a plurality of first wipers slidably mounted on said table and adapted for reciprocating movement toward and away from said pad holding means in a plane substantially at right angles to the motion of said first reciprocating means; a plurality of second wipers slidably mounted on said door and adapted for reciprocating movement toward and away from each other in a plane substantially parallel to but spaced from the plane of motion of said first wipers; drive means supported by and driven by said first fluid-actuated means; adjustable cam means connecting said first wipers to said drive means for positioning said first wipers in respect to said pad holding means in accordance with predetermined positions of said drive means; third fluid-actuated reciprocating means mounted in said pad holding means and operatively connected to said second wipers; and timing means mounted on said stand for operatively energizing in predetermined timed relationship said first, second, and third fluid-actuated reciprocating means.

7. A pad covering machine comprising: a base; a table supported by the base; pad holding means mounted on said table; a support bar mounted on the base above the table; a first air cylinder mounted on said bar; first drive means adjustably connected to the piston of said first air cylinder for reciprocating motion thereby; cam means pivoted to said bar and operatively linked to said drive means; slidable means on said table adjustably connected to said cam means; adjustable guide means mounted on said table in predetermined relation to said slidable means; a plurality of first wipers slidably mounted on said table and operatively connected to said slidable means and said guide means to be moved toward and away from said holding means by the combined action of said slidable means and said guide means; a plurality of second wipers supported by said table and adapted for reciprocating motion in a plane substantially parallel to the plane of motion of said first wipers, said second wipers being spaced from said first wipers; at least one second air cylinder supported by said table and operatively connected to said second wipers thereby to actuate them; and timing means mounted on said base for sequentially timing the movements of the piston of said first cylinder with the movement of the piston of said second cylinder.

8. A form covering machine comprising a table; a form holding means provided on said table; a support bar mounted above the table; a first reciprocating means mounted on the support bar; a lengthwise extending drive bar adjustably connected to said first reciprocating means and movable toward and away from the table; at least one cam means supported by said support bar and adapted to be moved inwardly by said drive bar when the latter has moved a predetermined distance toward said table; slidable means on said table adjustably and pivotally connected to said cam means so as to be moved by the latter toward said form holding means as the drive bar moves toward the table; a plurality of first wipers slidably supported on the table on one side of said form holding means and having slidable intermeshing tongue portions adjacent said form holding means; at least one guide means adjustably mounted on said table and coacting with said sliding means to move said wipers toward each other and said form holding means as said drive bar moves toward said table; a plurality of second wipers mounted on said table and slidable in a plane substantially paralleled to the plane of motion of said wipers, said planes of motion being spaced apart; reciprocating means for actuating said second wipers; and timing means operated by said drive bar for timing both of said reciprocating means in predetermined sequential relation.

9. A machine for covering a form with covering material comprising: a base; a table horizontally supported on the base and having a discharge hole therein; form holding means positioned in said hole; a support bar mounted on the base above said table; a first air cylinder mounted on said support bar with its piston projecting toward said table; a ram carried by said piston; a horizontal lengthwise extending drive bar adjustably mounted on said ram; cam levers pivotally hung by one end thereof from each end of said support bar, each cam lever being provided with a cam slot extending lengthwise thereof and adapted to receive a cam follower mounted at each end of said drive-bar; a pair of T-bars, each slidably mounted on said table at each end thereof, each T-bar being adjustably and pivotally connected to the bottom of the respective cam lever, and being provided with slots therein extending in a direction at right angles to the motion of the T-bar; a pair of adjustable cam plates, each overlying a T-bar and being provided with inwardly inclined slots which overlap the said slots in the T-bars at an angle thereto; a plurality of first wipers slidably mounted on the table, each of which has a tongue portion which slides in a groove provided in the adjacent wiper, said wipers intermeshing and being adapted to move toward and away from said form holding means; a projecting stud for each wiper engaging a T-bar slot and a cam-plate slot; a door pivotally hung from the underside of the table and adapted to be moved upwardly to constitute a bottom for said hole; a second air cylinder mounted on the base below said hole with its piston pivotally connected to said door; a plurality of second wipers mounted on said door within said hole; at least one third air cylinder operatively connected to said second wipers for moving the latter in a plane substantially paralleled to but spaced from the plane of motion of said first wipers; at least one timing bar mounted on said drive bar and slidably extending upward through said support bar; and at least one timing switch mounted on said support bar and adapted to be actuated by said timing bar for controlling the predetermined sequential motion of said air cylinders.

10. A subassembly for use in a pad-covering machine comprising: a bed supported on legs and having a top surface and a bottom surface, said top surface having provided therein a plurality of grooves inclined inwardly toward each other, and having bed slots through said bed at the inner ends of said grooves; a plurality of wipers slidable on said top surface, each wiper being provided on its under surface with a key which engages one of said grooves; a pair of actuator plates slidable toward and away from each other against said undersurface, each of said plates being provided with a plurality of slots therethrough, each of which overlaps one of said bed slots; a pin fastened to each of said wipers, each pin projecting through a pair of overlapping slots so as to be engaged thereby; actuating means operatively connected to said actuator plates for moving the latter toward and away from each other, thereby to move said wipers toward and away from each other; and adjustable stop means for limiting the motion of said actuator plates.

11. The subassembly of claim 10, in which each of said wipers comprises a flat bilayered plate, the top layer of which comprises a rubber-like material.

12. The subassembly of claim 10 in which means are provided for holding said wipers to said bed, said means comprising a plurality of permanent magnets mounted in said bed and said wipers being made at least partly of magnetic material.

13. A subassembly for use in a pad-covering machine comprising: a base; a plurality of wipers on said base, each of said wipers comprising a bilayered flat plate with one surface of said plate being a layer of resilient material having a high coefficient of friction with respect to covering material, and said wipers being slidable diagonally toward and away from each other; diagonally disposed guide means on said base for guiding said wipers; a pair of actuator plates slidable toward and away from each other on said base and operatively connected to said wipers; and adjustable stop means mounted on the base for arresting the motion of said actuator plates away from each other.

14. A pad covering machine comprising: a table; pad holding means supported by the table; a first reciprocating means supported by the table on one side of said pad-holding means; second reciprocating means mounted on said table and slidable toward and away from said pad-holding means; said pad-holding means comprising a subassembly supported by the table on the other side of said second reciprocating means remote from said first reciprocating means and including a third reciprocating means slidable along one face of a pad mounted on said holding means; guide means mounted on said table for guiding said second reciprocating means; adjustable cam means connecting said first reciprocating means and said second reciprocating means for causing the latter to move in a predetermined relation to said first reciprocating means; and timing means for sequentially timing the predetermined motions of said first, second and third reciprocating means.

References Cited in the file of this patent
UNITED STATES PATENTS

| | | |
|---|---|---|
| 1,289,969 | Devine | Dec. 31, 1918 |
| 1,594,352 | Christman | Aug. 3, 1926 |
| 2,580,846 | Sayer et al. | Jan. 1, 1952 |